US009734195B1

(12) United States Patent
Pandit et al.

(10) Patent No.: US 9,734,195 B1
(45) Date of Patent: Aug. 15, 2017

(54) AUTOMATED DATA FLOW TRACKING

(71) Applicant: Veritas Technologies LLC, Mountain View, TX (US)

(72) Inventors: Bhushan Pandit, Pune (IN); Wasim Ilkal, Pune (IN); Namita S. Agrawal, Pune (IN); Vishal Bajpai, Roseville, MN (US)

(73) Assignee: Veritas Technologies LLC, Mountain View, CA (US)

( * ) Notice: Subject to any disclaimer, the term of this patent is extended or adjusted under 35 U.S.C. 154(b) by 194 days.

(21) Appl. No.: 13/895,914

(22) Filed: May 16, 2013

(51) Int. Cl.
G06F 17/30 (2006.01)

(52) U.S. Cl.
CPC .............. G06F 17/30424 (2013.01)

(58) Field of Classification Search
CPC ........... G06F 17/3071; G06F 17/30864; G06F 17/30598; G06F 17/30991; G06F 17/30705; G06F 17/30713; G06F 17/30545
USPC ....... 707/737, 758, 100, 692, 693, 741, 724, 707/749; 705/10, 26; 704/209
See application file for complete search history.

(56) References Cited

U.S. PATENT DOCUMENTS

| 5,909,677 | A * | 6/1999 | Broder ................. G06F 17/3071 |
| 7,272,594 | B1 * | 9/2007 | Lynch et al. |
| 7,730,316 | B1 * | 6/2010 | Baccash .................. G06F 21/64 382/225 |
| 7,996,373 | B1 * | 8/2011 | Zoppas ............... G06F 17/3051 707/694 |
| 8,121,993 | B2 * | 2/2012 | Blount .................... G06F 21/32 707/609 |
| 8,560,546 | B2 * | 10/2013 | Frieder ............. G06F 17/30687 707/737 |
| 8,719,225 | B1 * | 5/2014 | Rath .................. G06F 17/30578 707/634 |
| 9,058,378 | B2 * | 6/2015 | Schuil ................. G06F 17/3069 |
| 2002/0099723 | A1 * | 7/2002 | Garcia-Chiesa .. G06F 17/30864 |
| 2003/0182310 | A1 * | 9/2003 | Charnock et al. ......... 707/104.1 |
| 2004/0243403 | A1 * | 12/2004 | Matsunaga et al. .......... 704/209 |
| 2007/0143322 | A1 * | 6/2007 | Kothari ............... G06F 17/2211 |
| 2007/0198364 | A1 * | 8/2007 | Quoc et al. ...................... 705/26 |
| 2008/0065630 | A1 * | 3/2008 | Luo .................... G06F 17/30569 |
| 2008/0114750 | A1 * | 5/2008 | Saxena ............. G06F 17/30687 |
| 2009/0012974 | A1 * | 1/2009 | Cassidy ........................ 707/100 |
| 2009/0077124 | A1 * | 3/2009 | Spivack et al. ........... 707/103 Y |
| 2009/0254515 | A1 * | 10/2009 | Terheggen .......... G06F 17/3002 |
| 2009/0324026 | A1 * | 12/2009 | Kletter ............... G06K 9/00442 382/124 |
| 2010/0004975 | A1 * | 1/2010 | White et al. .................... 705/10 |

(Continued)

Primary Examiner — Jeffrey A Burke
Assistant Examiner — Thong Vu
(74) Attorney, Agent, or Firm — Campbell Stephenson LLP

(57) ABSTRACT

Various automated data flow tracking techniques can involve obtaining metadata identifying the data items from multiple data sources and using that information to identify the relationships among the data items. This information can then be provided to users. For example, a method can involve receiving a query; accessing metadata, which identifies data items generated by multiple data sources; identifying a set of responsive data items from among the available data items; identifying one or more relationships between the data items in the set of responsive data items, and responding to the query with information identifying the set of responsive data items and the one or more relationships.

19 Claims, 6 Drawing Sheets

(56) References Cited

U.S. PATENT DOCUMENTS

| | | | |
|---|---|---|---|
| 2010/0042624 A1* | 2/2010 | Min | G06F 17/30607 |
| 2011/0055209 A1* | 3/2011 | Novac | G06F 17/211 |
| | | | 707/737 |
| 2011/0314031 A1* | 12/2011 | Chittar | G06F 17/3025 |
| | | | 707/749 |
| 2011/0320469 A1* | 12/2011 | Canessa et al. | 707/758 |
| 2012/0124011 A1* | 5/2012 | Spackman | G06F 17/30162 |
| | | | 707/692 |
| 2012/0215791 A1* | 8/2012 | Malik | G06F 17/30292 |
| | | | 707/749 |
| 2012/0259852 A1* | 10/2012 | Aasen et al. | 707/737 |
| 2013/0144834 A1* | 6/2013 | Lloyd | G06F 17/30864 |
| | | | 707/617 |
| 2014/0040710 A1* | 2/2014 | Smith | 715/201 |

* cited by examiner

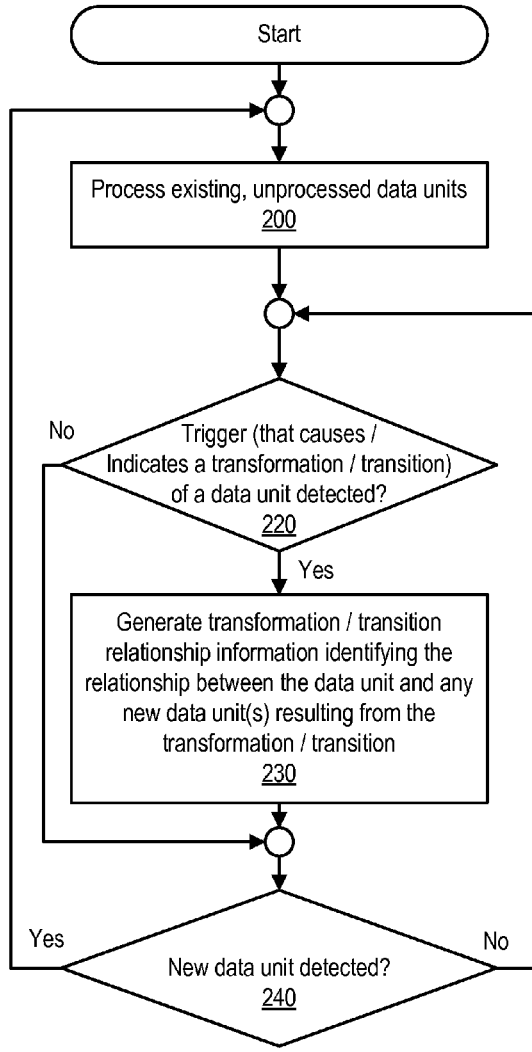
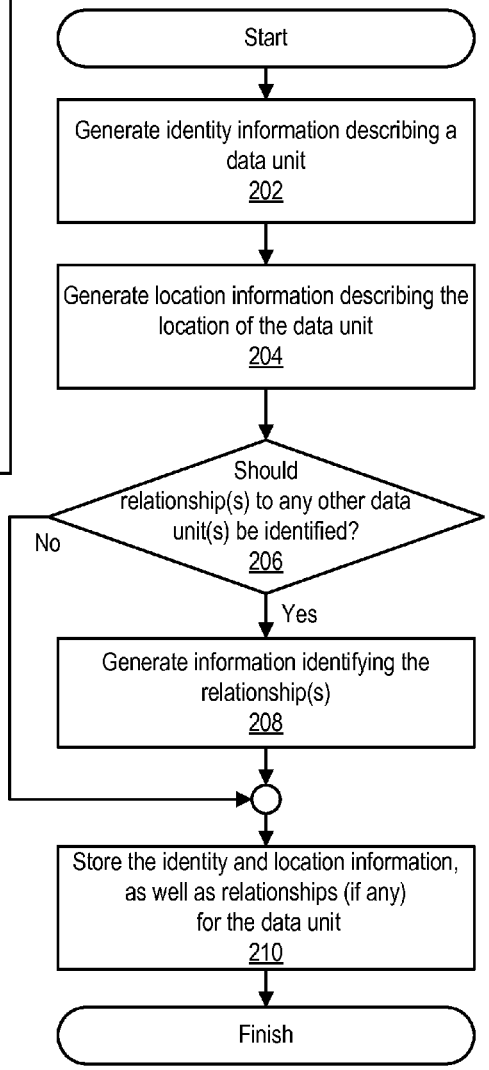
FIG. 2A
FIG. 2B

AUTOMATED DATA FLOW TRACKING

FIELD OF THE INVENTION

This invention relates to data governance and, more particularly, to automating the organization of data for data governance purposes such as electronic discovery.

DESCRIPTION OF THE RELATED ART

Modern entities such as corporations, non-profit organizations, government offices, educational facilities, and the like tend to generate ever-increasing amounts of data in their day-to-day operations. While each individual item of data can be an asset to the entity that generated it, maintaining large amounts of unorganized data can also represent a liability. If the entity becomes involved in litigation or is otherwise investigated (e.g., for compliance with legislative rules and regulations, to discover how confidential documents were leaked outside of the entity, and the like), the entity's data may be subject to search. As the amount of data maintained by an entity increases, so does the amount of manpower required to look for items of data that are of particular interest to any search.

BRIEF DESCRIPTION OF THE DRAWINGS

The present invention may be better understood, and its numerous objects, features and advantages made apparent to those skilled in the art by referencing the accompanying drawings.

FIG. 2A is a flowchart of a method of automatically tracking the flow of information in a computing environment, according to one embodiment.

FIG. 2B is flowchart illustrating more details as to how information used to track a particular data unit through a computing environment can be generated, according to one embodiment.

Figure 1:
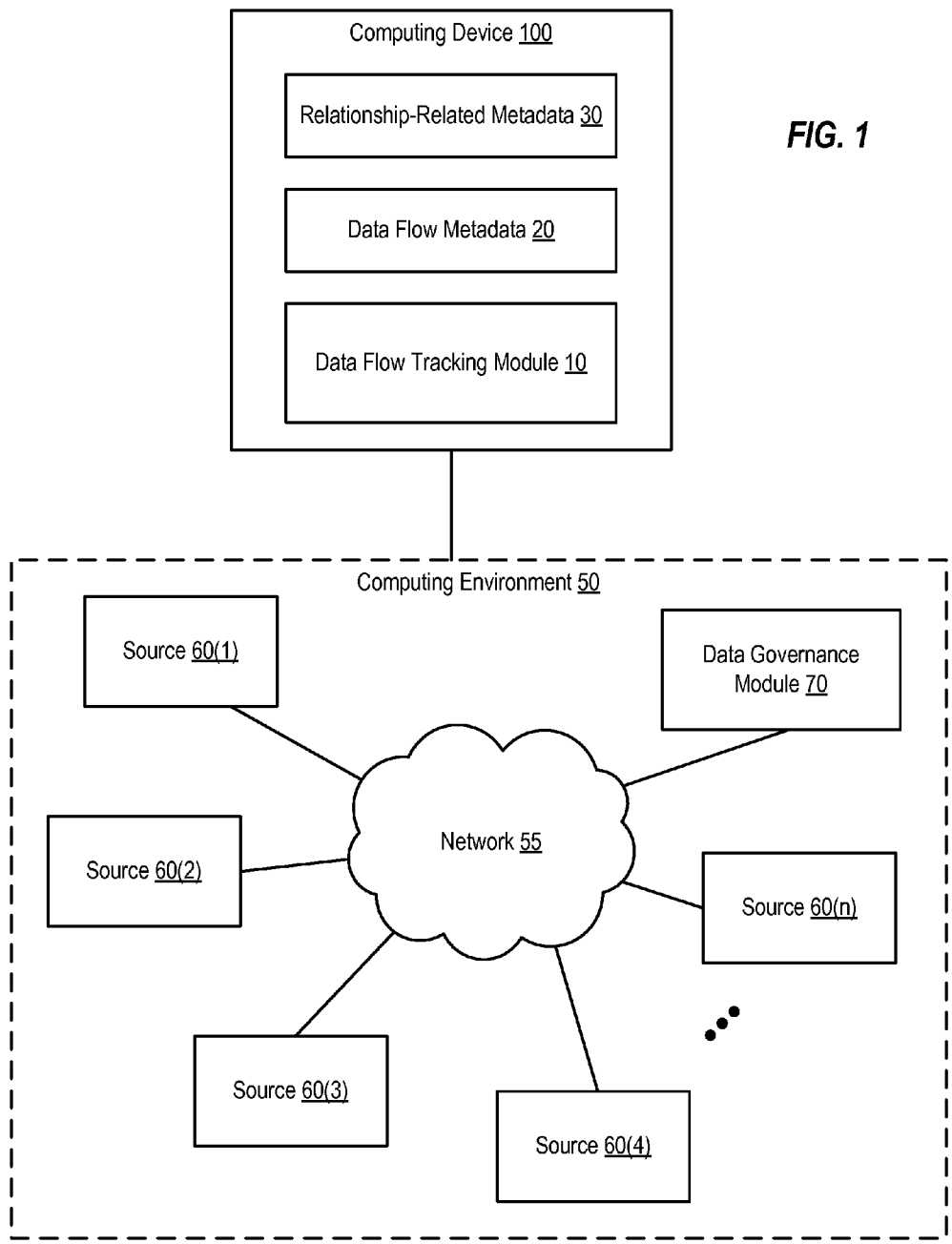
FIG. 1 is a block diagram of a networked computing environment that is maintained by an entity, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

FIG. 1 is a block diagram of a networked computing environment that is maintained by an entity such as a corporation, non-profit organization, educational institution, government office or agency, or the like. As shown, this system includes a computing environment 50 that includes a variety of different data sources, labeled sources 60(1), 60(2), 60(3), 60(4) . . . 60(n). The number of data sources (and thus the value of n) can vary among entities and embodiments. These data sources (collectively referred to as sources 60) are coupled by one or more networks, including network 55, to each other and to computing device 100 and data governance module 70. Network 55 can be implemented using a Wide Area Network (WAN) such as the Internet, one or more Local Area Networks (LANs), and/or one or more Storage Area Networks (SANs), as well as various underlying technologies, including wireless links, fiber optic cables, electrical cables, and the like.

Computing device 100 is a computing device such as a personal computer, laptop computer, server, personal digital assistant, cell phone, or the like that implements a data flow tracking module 10. Computing device 100 can include and/or be coupled to (e.g., via a bus, network, or other appropriate interconnect) a storage device (as described in more detail below with respect to FIG. 5) for storing a persistent copy of information such as data flow metadata 20. Such a storage device can provide persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape). In some embodiments, such storage devices can be implemented using cloud storage, in which the storage device is a logical storage device to which physical storage device(s) are allocated on an as-needed and/or as-contracted basis.

Many of data sources 60 are configured to generate items (e.g., files or other logical objects, such as entries in a database or portions of a file) of data by either creating entirely new items of data or by manipulating existing items, which may have in turn been created by another source. Each source may also be able to create copies of existing items of data. Sources 60 can each be a computing device or an application executing on a computing device. As an example, sources can include a desktop or laptop computing device (e.g., that includes a word processing application and an email client), a mobile device (e.g., a mobile phone, handheld electronic reader, or the like), a server computing device (e.g., that includes an email server and/or file server), and the like, or a specific application running on such a device. Sources 60 can also include data repositories, such as hard drives and storage systems, that store copies of data items created by other sources.

Data governance module 70 is a data governance tool such as Data Insight and/or Data Loss Prevention, both available from Symantec Corporation of Cupertino, Calif., that, among other functions, is configured to discover data stored throughout a computing environment like computing environment 50 and to monitor activity affecting the data stored within that computing environment. Data governance module 70 can operate by routinely (e.g., periodically and/or in response to predetermined stimuli) discovering (e.g., identifying the existence of) new items of data that have been generated within the computing environment and adding those newly-discovered items to an inventory (e.g., by adding information that identifies each item and its location within the system to a database that stores the inventory).

Data governance module 70 can also routinely monitor and track accesses to the inventoried data (e.g., data already identified in its inventory). As accesses to inventoried data are discovered, data governance module 70 can update its inventory to identify the accesses that have taken place (e.g., reads, writes, deletions, property modifications, and so on), as well as any other relevant information about the accesses (e.g., the time at which the access took place, the identity of the user, application, and/or computing device that initiated the access, the data's pre- and post-modification size or properties, and the like).

While data governance module 70 is shown as a single module in this example, data governance module 70 can, in some alternative embodiments, be implemented using a distributed architecture, such that all or some of sources 60 include data governance agents that perform discovery and monitoring for their respective sources and report information back to a centralized data governance controller that maintains the inventory.

Data flow tracking module 10 is configured to interact with data governance tool 70 or a set of several different data governance tools, if the computing environment includes more than one (in such a situation, some of the data governance tools may be provided by different manufacturers). Data flow tracking module 10 interacts with data governance tool 70 in order to obtain information gathered by data governance tool 70 describing the various data items within computing environment 50, as well as the accesses that have been performed on those data items. In one embodiment, data flow tracking module 10 is configured to query (or receive updates or alerts automatically from) data governance tool 70 (e.g., via a command line interface (CLI) or application programming interface (API)). In other embodiments, data flow tracking module 10 can directly access metadata (e.g., such as an inventory describing the data contents of computing environment 50 and the accesses that have occurred to the inventoried data contents) generated by data governance tool 70. For example, data flow tracking module 10 can directly query an inventory database maintained by data governance tool 70. In still other embodiments, data flow tracking module 10 may be part of the same software suite as data governance tool 70 (or even integrated within data governance tool 70 itself) and configured to access metadata generated by data governance tool 70 in the same manner as data governance tool 70 does. In yet other embodiments, data flow tracking module 10 may include a data governance tool 70 and thus may generate such metadata itself instead of obtaining such metadata from another module.

Data flow tracking module 10 thus has access to information describing the data items currently present within computing environment 50. Data flow tracking module 10 can also obtain information describing the types of access that occurred to those data items subsequently to their being inventoried by a data governance tool. Data flow tracking module 10 can then store these two types of information (and/or information derived from one or both of these types of information) as relationship-related metadata 30, which can in turn be used to generate data flow metadata 20.

Data flow metadata 20 describes the flow of information through computing environment 50. To describe this data flow, data flow metadata 20 identifies relationships between different data items. Such relationships can include the relationships between different data items that include the same or similar content (e.g., such a relationship could identify each data item as well as the content shared among related data items), data items that represent different versions of each other (e.g., such a relationship could identify each data item, as well as the relative time at which each was created with respect to each other), data items generated in response to other data items (e.g., such a relationship could identify each data item, as well as the sequence in which the identified data items were generated), and the like. The particular relationships that are identified within data flow metadata 20 can vary among embodiments.

As briefly noted above, relationship-related metadata 30 can be used to generate data flow metadata 20, so that data flow tracking module 10 can dynamically generate relationship-identifying information for a particular data item in response to a particular user query. Relationship-related metadata 30 can include information identifying various accesses to data and identifying various sequences of events, as well as other information (e.g., such as file system metadata, content indexing information, location information, data item identification information, and the like). Based on this relationship-related metadata 30, data flow tracking module 10 can identify relationships on-the-fly. For example, if a user wants to see the data items associated with a particular user, the user can submit a query identifying that user and, in response, data flow tracking module 10 can search relationship-related metadata 30 for accesses that were initiated by that particular user and/or for data items that identify the particular user. A list of data items that were accessed by the particular user and/or that identify the particular user (e.g., within the content of the data items) can then be returned to the querying user. Additionally, based upon relationship-related metadata 30, the relationships for the listed data items can be determined on-the-fly, allowing the data flow tracking module 10 to also return a list of items that are related to already-listed data items, as well as (in some embodiments) information identifying the relationships between the related items and the already-identified items. In general, if a particular data item is identified as being of interest in response to a particular query, data flow tracking module 10 can then use relationship-related metadata 30 generate data flow metadata 20 for that particular data item to identify whether there are any related items (i.e., items for which relationships to the particular data item have been identified in data flow metadata 20). Data flow tracking module 10 can present all related items in response to the query, or, in some embodiments, further select only some of the related items to present based upon other criteria (e.g., such as the type of relationship to the particular data item).

There are several different types of data that can be included in relationship-related metadata 30 and data flow metadata 20. In some embodiments, the metadata includes four types of information: data item identifying information (also referred to as identity information), data item location information (also referred to as location information), transition and/or transformation information, and trigger information. These types of information are explained in more detail below.

The data item identifying information for each data item is part of relationship-related metadata 30 and can include a set of three types of information: a fingerprint, index information, and other metadata. The metadata can include the metadata that an application (e.g., a file system or database) uses to describe the data item (e.g., in terms of size, permissions, ownership, access and/or creation date(s), and the like) and can be obtained by either querying that application directly or by obtaining the metadata from a data governance tool.

The set of data item identifying information for a given data item both uniquely identifies that data item and also provides information usable to determine the degree of similarity between that data item and one or more other data items. Degrees of similarity can range from identical, in which case one data item matches another data item in its entirety, to completely distinct, in which case the data item has no content that matches the content of the other data item. In between these two extremes, it is possible for data items to share one or more subsets of data. The greater the amount of shared content, the greater degree of similarity between the two data items. A non-zero degree of similarity is a relationship between two data items, since such a degree a similarity indicates that the two data items have at least some shared content.

The fingerprint acts as a means of uniquely identifying the entire contents of a data item. The fingerprint allows a determination as to whether two data items are identical. Accordingly, the fingerprint is calculated in a way that depends upon the contents of the data item, such that data items with identical contents will have the same fingerprint and data items with non-identical contents will not have the same fingerprint. Fingerprints can be generated using a hash or checksum function, or a combination of several such functions.

The index information for a data item is information usable by a search engine that identifies one or more sets of words (which can be selected as key words by an administrator when configuring the data flow tracking module or which can be identified by the data flow tracking module itself based upon predefined constraints) or other data patterns that occur within the data item. The index information can identify characteristics such as which words or sets of words (or other data pattern) are included within the data item, the relative proximity of a word or set of words to another word or set of words (e.g., for textual content, relative proximity could indicate the amount of intervening text between two words or sets of words) within the data item, the number of times that a given data pattern (such as a word or set of words) appears within the data item, and the like.

The index information is usable to allow data flow tracking module 10 to determine how much of the contents of a given data item match the contents of another data item. As noted above, if two data items have at least some degree of similarity, data flow metadata 20 can be updated to indicate that these two data items have a relationship. Data flow metadata 20 can identify this relationship by identifying the two related data items, the shared pattern(s) within the two data items, and/or the relative amount of data that is shared between the two data items. As an example, a set of data flow metadata for a system that includes five items of data (Data Items A-F) could identify that Data Item A is 65% the same as Data Item B, that Data Item C includes a copy of all of Data Item D, that Data Items E and F are identical, and so on.

It is noted that a single unit of data can be represented as several data items by data flow tracking module 10. For example, a single file can be subdivided into multiple pieces, and each piece can be represented as a unique data item, as can the entire file. Thus, one data item may contain several other data items. Data flow tracking module 10 can, in some embodiments, be configured to parse a single data item into multiple pieces in order to provide an increased degree of similarity between one or more of the individual pieces and other data items (or pieces of data items). For example, an email that includes a paragraph that was copied from another document can be 35% similar to the other document. However, if the email is subdivided into two pieces (the copied paragraph and the remaining non-copied portion of the email), and if the other document is similar subdivided (the copied paragraph and the remaining non-copied portion of the other document), there will now be two identical data items (the copied paragraph in the email and the copied paragraph in the other document) and two other data items which may not be related at all (at least in terms of shared content). Additionally, the individual pieces of data are related to the data items from which they were parsed, such that the copied paragraph in the email is related to the email by virtue of being included within it, and so on. Data flow tracking module 10 can subdivide data items into smaller data items dynamically (e.g., in response to a user query specifying a portion of a data item or key words or patterns related to portions of one or more data items) and/or on an ongoing basis as data flow tracking module 10 encounters new data items (or triggers) are identified by data governance module 70.

The location information is part of relationship-related metadata 30 and describes where a data item is stored. The location information can identify, for example, the path to the specific directory or file in which the data item is stored within a file system. The location information can also (or alternatively) identify the specific logical block address(es) that store the data item. The location information can also identify the particular application(s) and/or service(s) used to create and/or manage the data item. Location information may also include a timing element, indicating when the data item resided in a particular location. Location information can reference the appropriate identity information for the data item being described.

The transition and/or transformation information is part of data flow metadata 20 and indicates a relationship between data items that are generated when one data item undergoes a transition and/or transformation that results in a new data item. Such transitions and/or transformation information identifies two different data items (which may just be different chronological versions of the same data item), as well as containing a reference (e.g., pointer) to the trigger information (described below) describing the trigger that led to the transition or transformation. Transition and/or transformation information indicates the chronological relationship between the two data items (e.g., by including timing information indicating the which of the two data items was created first, the order in which the data items were created, or the like). Thus, transition and/or transformation information identifies chronological relationships between data items. Such information may represent the relationship as a parent-child relationship, as a subset relationship, using a tree, and the like. Transition and/or transformation information is generated from trigger information and/or in response to a data governance tool providing information indicating that a transition and/or transformation has taken place.

Transitions and transformations can include location changes (e.g., when a data item is moved to a new location), format transformation (e.g., when a data item is converted from one file type to another, or when a data item is otherwise reformatted), the scattering and/or gathering of portions of a data item into a new data item, and the like. Transitions and transformations occur when a new data item (with a unique set of identity information) is created in a way that establishes a relationship between that new data item and a preexisting data item.

The trigger information is part of relationship-related metadata 30 and identifies the reason(s) for each transition or transformation. Trigger information can identify a trigger and the data items targeted by and/or resulting from the trigger. Data flow tracking module 10 may identify triggers either directly (e.g., in response to receiving a notification or query response identifying a trigger from a data governance tool) or by inference (e.g., based upon analysis of the type and/or result of a transition and/or transformation). In some embodiments, an administrator may manually configure data flow tracking module 10 with information usable to identify triggers and/or information identifying individual triggers. Additionally, some embodiments of data flow tracking module 10 may flag (e.g., by setting a value of a flag variable, by generating an alert or error message, by updating a log, or the like) situations in which a trigger cannot be identified for a detected transition and/or transformation. The data flow tracking module 10 may analyze multiple flagged transitions and/or transformation in order to detect whether a common pattern is occurring; if so, data flow tracking module 10 can identify that common pattern as the trigger for the flagged transitions and/or transformations sharing that pattern. Alternatively, an administrator may routinely review flagged transitions and/or transformations and manually input the triggers for those flagged relationships.

Examples of triggers include operations such as cut, copy, and paste that are capable of moving or copying data from one data item to another, either within the same application or among multiple applications. Other triggers include export operations that convert a data item from one identity and/or type to another. For example, an image file can be exported under a new name, with a new size, using a different encoding processor, and the like. Similarly, a spreadsheet can be exported from an application such as Microsoft Excel™, undergoing a conversion from an application-specific file type (e.g., .xls) to another file type (e.g., html).

Appending, prepending, and/or inserting information into a data item are other examples of triggers. Such triggers include, for example, attaching a file or set of files to an email message or posting a file to a social media web page.

Triggers can be detected by parsing metadata provided by a data governance module, comparing the degree of similarity and relative creation times between two data items, accessing revision information provided by a data governance module, and the like. Other applications, such as those used to provide gatekeeping functionality (e.g., by allowing users to access data items via a check-in, check-out mechanism), may also provide information that data flow tracking module 10 can use to identify triggers.

FIGS. 2A and 2B provide an example of a method of maintaining relationship-related metadata 30 and data flow metadata 20 in embodiments that maintain four types of information: identity information, location information, transition and/or transformation information, and trigger information. The operations shown in FIGS. 2A and 2B can be performed by a data flow tracking module (e.g., data flow tracking module 10 of FIG. 1). A method of using such metadata to respond to user queries is described below and in FIG. 4.

FIG. 2A begins with the performance of operation 200, where unprocessed (at least by the data flow tracking module) data items are processed to generate appropriate identity and location information. The unprocessed data items can be identified by interacting with other applications, such as data governance applications, that discover data items within a system. In some embodiments, individual data items are identified by parsing a larger data item into two or more smaller data items (e.g., based upon the fingerprints or indexing information for the component items relative to those of other, already-processed data items). More details of how operation 200 can be performed on an individual data item are shown in FIG. 2B.

Unprocessed data items can be processed when the data flow tracking module initially begins operation. This operation may be repeated routinely (e.g., at certain intervals, such as every 24 hours, or in response to certain predefined stimuli) in order to capture any new data items that have been created subsequent to the prior performance(s) of operation 200.

After unprocessed data items have been processed (or while unprocessed data items continue to be processed at 200), the data flow tracking module can perform operation 220 to detect a trigger (which is an event that causes a transformation or transition, or otherwise indicates that a transformation or transition has taken place) affecting one of the data units identified at 200. The data flow tracking module can detect a transformation or transition in a variety of different ways. For example, the data flow tracking module may have requested that a data governance module notify the data flow tracking module whenever a transition or transformation in monitored data occurs. Alternatively, the data flow tracking module may routinely query the data governance module for information indicating whether any transitions and/or transformations have taken place.

If a trigger is detected at 220, the data flow tracking module can then generate data flow metadata that includes information identifying the related transition and/or transformation, the trigger condition that caused the transition and/or transformation, and the data item targeted by and/or affected by the transition and/or transformation, as indicated at 230. For example, if a user cuts a section of text from a first data item and pastes that section of text into a second data item, the data flow tracking module can generate metadata indicating that a relationship exists between the first and second data items, that the relationship was established in response to a cut-and-paste operation, and that the two data items are related by the section of the text that was removed from the first data item and placed into the second data item. The metadata can also include a chronological relationship between the two data items, such that the first data item contained the section of text prior to that section of text being included in the second data item.

In addition to monitoring for triggers at 220, the data flow tracking module can also monitor for the addition of new data items to the system at 240. If new data items are detected (e.g., in response to routinely querying a data governance tool for the identities of data items created subsequent to the prior performance of operation 200), operation 200 can be repeated so that relationship-related metadata is available for all data items in the system. While, for simplicity, FIG. 2A shows operations 220 and 240 being performed in series, it is noted that these two operations can be implemented in independent processes that operate in parallel.

FIG. 2B illustrates how operation 200 of FIG. 2A can be performed on an individual data item. This method begins by generating identity information that describes the data item, as indicated at 202. As noted above, this identity information can include metadata, a fingerprint, and indexing information. Generating this information may involve simply obtaining this identity information from an application or data governance tool and/or storing the identity information (or a pointer to that information) in a storage area maintained by the data flow tracking module.

The data flow tracking module then generates location information for the data item, as indicated at 204. This location information can identify the data item in terms of both storage location and the application or service used to create and/or access the data item.

At 206, a determination is made, based on the existing relationship-related metadata for the data item and/or other data items, as to whether any relationships should be identified for the data item. This can involve accessing logs (e.g., via a data governance tool) that show prior transitions and/or transformations that either targeted or affected the data item, as well as based upon information such as indexing information (e.g., to determine a degree of similarity to another data item). If one or more relationships can be identified, the data flow tracking module can generate information identifying the relationships, as shown at 208. (Alternatively, instead of performing this operation when processing data units, the data flow tracking module can wait to perform this operation until a query is received. In this situation, instead of having to process all data units to identify relationships, the data flow tracking module will only need to process data units that are responsive to the query at hand.)

Any information—identity, location, and/or relationship—generated for the data item can then be stored, as indicated at 210. It is noted that, while the data flow tracking module can maintain a separate copy of all of this information, the data flow tracking module may also simply access an-already stored copy of this information (e.g., if metadata is already being stored by an application or data governance tool, the data flow tracking module can simply maintain a pointer to that information instead of making a separate copy of that information).

Returning to FIG. 1, it is noted that other embodiments may operate without explicitly using the four types of metadata (identity, location, transition and/or transformation, and trigger) described above and with reference to FIGS. 2A and 2B when tracking the flow of data through an organization. For example, in one alternative embodiment, relationship-related metadata 30 and data flow metadata 20 can be generated in a data-source-specific manner, such that there is a different set of relationship-related metadata and data flow metadata for each data source 60 within the system. Here, the data sources can include individual devices and/or applications (e.g., such as a laptop used by a particular employee, an email server that provides email services to the users within an organization, and the like). The data-source-specific metadata can be maintained by a centralized data flow tracking module 10 or can be distributed throughout the system (e.g., in which case the relationship-related metadata can be maintained by the data source itself, or by a data governance tool monitoring data items created on the data source). The data-source-specific metadata can include all or some of the identity information described above for each data item from that data source, including fingerprint, metadata, and/or indexing information. A portion of the source-specific metadata can eventually be combined with metadata specific to another source (e.g., when responding to a user query).

An example, there can be N data sources $S_1, S_2, S_3, \ldots, S_{N-1}, S_N$ in the system. Each data source can include a large number of data items, and the number of data items included on each data source can vary. These data items can be identified, for purposes of this example, in terms of the source in which they are included and by a unique number identifying that data item within all of the data items on that source. So, data source $S_1$ can include X data items D: $(S_1, D_1), (S_1, D_2), (S_1, D_3), \ldots, (S_1, D_{X-1}), (S_1, D_X)$. Similarly, Data source $S_2$ can include Y data items D: $(S_2, D_1), (S_2, D_2), (S_2, D_3), \ldots, (S_2, D_{Y-1}), (S_2, D_Y)$, where Y can have a different value than X. This example will be referred to below when explaining how data-source-specific metadata is maintained.

Data-source-specific metadata can include data flow metadata obtained from one or more application logs and/or other information that identifies transitions and transformations that occurred on that data source and that relate data items on that data source to one another. For example, if a data source is a user laptop, a log maintained for that system can identify sequences of events that have occurred and that cause certain data items to be related to each other. For example, the laptop's user can copy a paragraph from a word processing document into an email, and then send that email. The act of copying can be recorded in the log, as can information relating the word processing document to the email. At least some of this data-source-specific data flow metadata can be maintained by the data sources themselves (or a data governance tool monitoring those data sources) and distributed throughout the system, instead of being maintained by data flow tracking module 10.

Additional data-source-specific data flow metadata can be generated by data flow tracking module 10 based upon the data-source-specific relationship-related metadata for that source. For example, if indexing information and/or fingerprints are maintained for the data items from that data source, data flow tracking module 10 can identify relationships between data items from that data source based upon their degrees of similarity. Data flow tracking module 10 can maintain data flow metadata 20 on a source-by-source basis identifying relationships between data items from the same data source. Data flow tracking module 10 can generate this source-specific data flow metadata either dynamically in response to a user query or, at least partially, in advance of any user queries on an ongoing basis. For example, in one embodiment, on an ongoing basis, data flow tracking module 10 can identify related data items on a source-by-source basis, using the data-source-specific relationship-related metadata.

Referring back to the example above with N data sources $S_1$-$S_N$, for each data source, data flow tracking module 10 can generate data-source-specific relationship-related and data flow metadata in terms of clusters and topics, based on relationships R that arise between different data items. These relationships can then be grouped into clusters C, where each cluster contains information identifying data items (e.g., using relationship-related metadata) and relationships between those data items (e.g., using data flow metadata) that correspond to a single topic T (a topic can indicate a common characteristic of data items, such as having related authors and/or readers, containing related content, and so on). For example, for data source $S_1$, a first cluster $C_1$ can be associated with topic $T_1$. Data items are added to cluster $C_1$ in response to new relationships being detected (e.g., by detecting triggers and/or transformation or transitions as described above). As a data item is added to cluster $C_1$, information identifying its relationship to one or more other data items in cluster $C_1$ is also added to cluster $C_1$. For example, data item $D_1$ and data item $D_2$ can be added to cluster $C_1$ in response to detecting that a user has copied text related to topic $T_1$ from data item $D_1$ and pasted that text into data item $D_2$. The copy-and-paste action can be identified as the relationship $R_1$ between $D_1$ and $D_2$. It is noted that a single data item can be included in multiple different clusters. Similarly, a single relationship may be included in multiple different clusters if that relationship has relevance to multiple different topics.

The data-source-specific metadata can also include timing information identifying the time at which relationships were established and/or the times at which related data items were created. This allows data flow tracking module 10 to order related data items relative to each other.

When a user queries data flow tracking module 10, data flow tracking module 10 can return a time-sorted list of data items, which can come from different data sources, that satisfy the query, and any related items. Data flow tracking module 10 can generate this list by searching each set of data-source-specific metadata (a portion of which may be generated dynamically, if needed) for data items that satisfy the query (e.g., by searching for topics corresponding to the query), as well as data items that are related to the data items that satisfy the query. Data flow tracking module 10 can also identify relationships between relevant data items from each of the different data sources. For example, related data items from different data sources can be identified by comparing data item fingerprints and/or indexing information or by identifying data items that were sent from one source to another (e.g., based upon addressing information in an email). Once relationships have been identified between the relevant data items from each data source, the corresponding source-specific lists of data items can be merged into a single, time-sorted list that lists data items (and their interrelationships) from multiple data sources.

As an example, consider a situation in which a user of source 60(1) (e.g., a laptop) copies a confidential file from source 60(2) (e.g., a corporate server) to source 60(3) (e.g., the user's personal storage device, such as a thumb drive) as well as the user's desktop on source 60(1). The user then sends an email, with the confidential file attached, to another user, who is using source 60(4) (e.g., a workstation). This other user can then forward the email from source 60(4) to several other users.

Source-specific metadata for each of sources 60(1)-60(4) can each identify the confidential file (e.g., by a fingerprint). Additionally, source-specific metadata for source 60(1) can identify that the confidential file was created (on the desktop) at time T2, and that the confidential file was attached to an email sent at time T3. Source-specific metadata for source 60(2) can indicate that the user of source 60(1) accessed the confidential file at time T1. Source-specific metadata from source 60(3) can indicate that the confidential file was created at time T4. Source-specific metadata from source 60(4) can indicate that the confidential file was received in an email attachment at time T5, and that the email was forwarded to three recipients at time T6.

If a user queries the data flow tracking module for information related to the confidential file (e.g., by presenting the file's signature or other identifying information to the data flow tracking module 10), the data flow tracking module can access (or generate, as needed) the source-specific metadata described above for each of sources 60(1)-60(4). The data flow tracking module can then merge this metadata into a time sorted list, which identifies that the file was accessed on data source 60(2) at T1, copied to source 60(1) at T2, emailed from source 60(1) at T3, copied to source 60(3) at T4, received by source 60(4) at T5, and emailed from source 60(4) at T6. If, for example, the query was submitted in an effort to determine the identity of the user who leaked the confidential document at time T8, wherein T8 occurred before T5, the results of the query indicate that only users who had access to sources 60(1), 60(2), and 60(3) could have accessed the confidential file at time T8.

Returning to the example of the system that includes data sources $S_1$-$S_N$, if clusters of data items and relationships relating to specific topics have been maintained for each data source S, then responding to a query can involve simply identifying one or more topics (on all of the data sources) that are relevant to the query, and then time sorting the data items contained within the cluster(s) associated with those topics. Thus, the data flow tracking module can identify that topics $T_1$ (which has related clusters on sources $S_1$ and $S_3$) and $T_5$ (which has a related cluster on source $S_2$) are relevant to the query. In response, the data flow tracking module can identify all of the data items within the clusters related to topics $T_1$ and $T_5$, as well as the appropriate timing information indicating when those data items were created/added to the cluster/became related to another data item in the cluster. This timing information can be used to time-sort all of the data items. The resulting list, which includes data items from sources $S_1$, $S_2$, and $S_3$, can then be returned in response to the query.

As a more detailed example, assume that there is a single cluster on each of sources $S_1$ and $S_3$ related to topic $T_1$. Cluster ($S_1$, $C_1$) includes data items ($S_1$, $D_2$), which was created at time t1, and ($S_1$, $D_3$), which was related to data item ($S_1$, $D_2$) at time t8. Cluster ($S_3$, $C_1$) includes data items ($S_3$, $D_1$), which was created at time t2, and ($S_3$, $D_7$), which became related to data item (S3, D1) at time t3. Additionally, there is a single cluster ($S_2$, $C_5$) on source $S_2$ that relates to topic $T_5$, and this cluster ($S_2$, $C_5$) includes data items ($S_2$, $D_2$), created at time t4, ($S_2$,$D_3$), which became related to data item ($S_2$, $D_2$) at time t5, and ($S_2$, $D_4$), which became related to data item ($S_2$, $D_3$) at time t10. Based upon the contents of these clusters and the timing information associated with each data item, the data flow tracking module can return a time-sorted list identifying ($S_1$, $D_2$) (a), ($S_3$, $D_1$) (t2), ($S_3$, $D_7$) (t3), ($S_2$, $D_2$) (t4), ($S_2$, $D_3$) (t5), ($S_1$, $D_3$) (t8), and ($S_2$, $D_4$) (t10). Thus, the data items from different data sources are ordered relative to each other in this final time-sorted list, which can also identify the various interrelationships between the listed data items.

Figure 3:
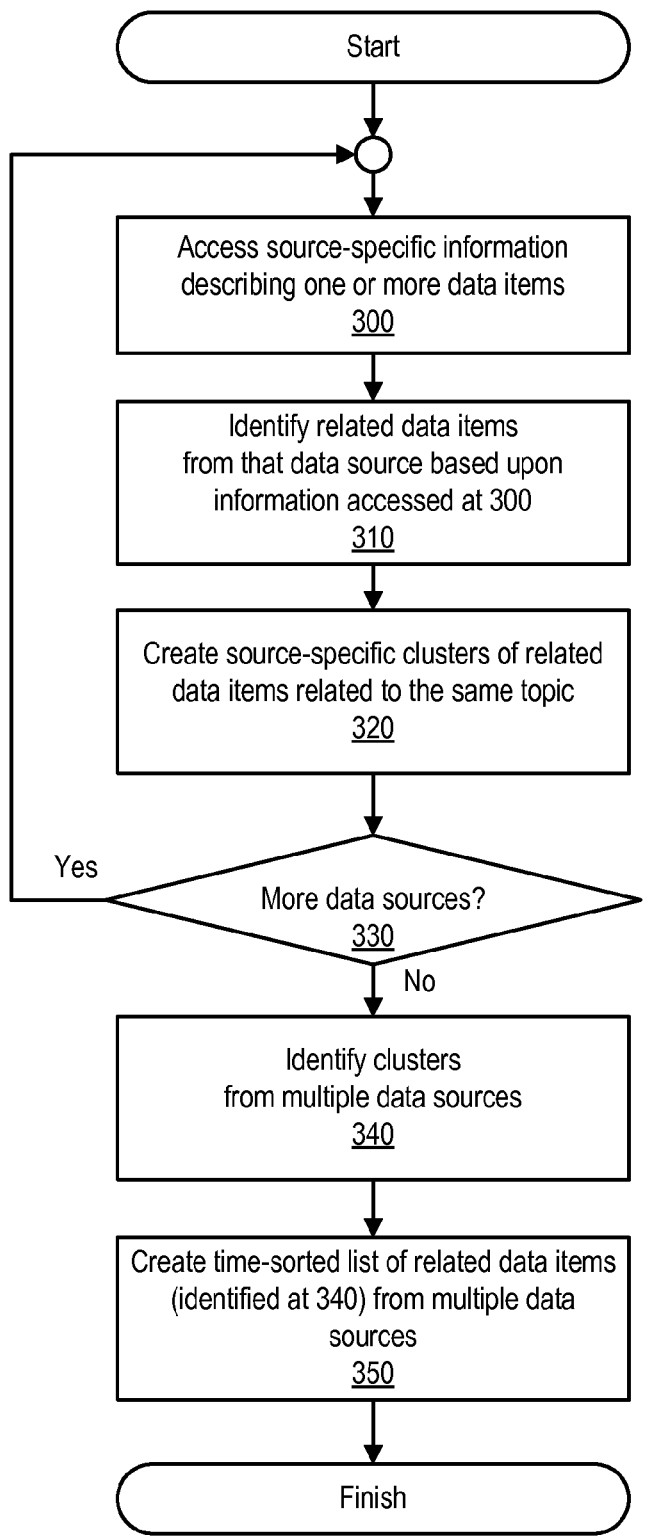
FIG. 3 is flowchart illustrating how the flow of data can be tracked through a computing environment, according to another embodiment.

FIG. 3 is a flowchart of a method of generating and maintaining the source-specific metadata described above and using that to generate a list of related data items from multiple data sources. The method of FIG. 3 can be performed by a data flow tracking module like data flow tracking module 10 of FIG. 1.

The method begins at 300, when the data flow tracking module accesses metadata describing one or more data items from a specific data source. The data flow tracking module can access this metadata by, for example, querying a data governance module. The source-specific metadata can include relationship-related metadata and/or data flow metadata.

The data flow tracking module can then identify related data items from that data source, based upon the information accessed at 300, as shown at 310. This can involve either determining the relationships from data flow metadata that is already available (e.g., such as metadata indicating transitions and/or transformations) or by processing relationship-related information (e.g., such as fingerprint and/or indexing information) to generate new source-specific data flow metadata.

The data flow tracking module can then generate source-specific clusters of related data items that are associated with the same topic, as shown at 320. Operation 320 can be performed on an ongoing basis and/or in response to a user query. Operations 300, 310, and 320 can be repeated for each data source in the system, as indicated at 330.

At 340, which can be performed in response to receiving a query from a user, the data flow tracking module can use the source-specific data flow and/or relationship-related information generated at 310 and 320 to identify related data items among all of the data sources (e.g., by identifying all of the clusters throughout the system that correspond to the same topic, or by identifying all of the clusters that correspond to topic(s) satisfying a user query). The relevant sets of source-specific metadata identified at 340 can then be merged into a single time-sorted list of data items, as shown at 350. This resulting list can identify data items from different sources, and can identify relationships (e.g., in terms of degrees of similarity) among data items from different data sources.

Figure 4:
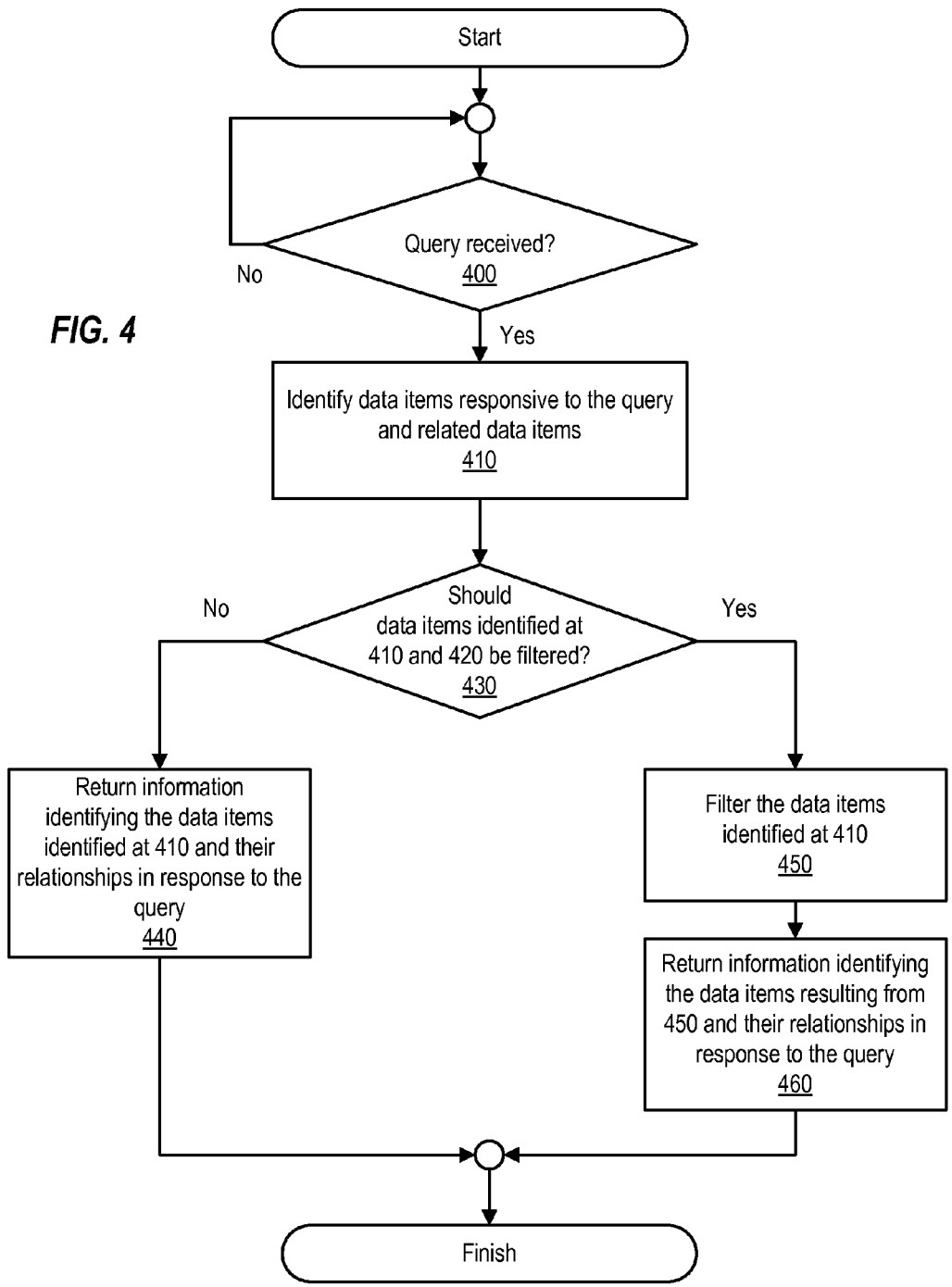
FIG. 4 is a flowchart illustrating how a data flow tracking module can respond to a user query, according to some embodiments.

FIG. 4 shows a method of how a data flow tracking module can respond to a user query, using the various types of relationship-related and data flow metadata described above. This method can be performed using either the four distinct types of metadata used in FIGS. 2A and 2B or the source-specific metadata used in FIG. 3.

The method of FIG. 4 can be performed in a variety of different contexts. For example, users can query a data flow tracking module for information as part of the process of performing electronic discovery for a lawsuit, as part of the process of determining compliance with regulations, as part of a civil or criminal investigation, as part of an internal confidentiality audit, and so on.

At 400, the data flow tracking module detects a user query. Such a query can be received via an interface such as a graphical user interface, command line interface, application programming interface, or the like. The query can specify a particular data item, a particular data pattern or key word or phrase, metadata (e.g., such as file type, file size, creation date, or the like), particular data sources, and the like.

Based upon the query, the data flow tracking module identifies data items that are responsive to the query, as indicated at 410. Performing this operation can involve searching relationship-related metadata (which can be maintained by the data flow tracking module and/or by other system components, such as data governance tools) in order to identify data items that satisfy the query. Performance of this operation can also involve accessing (or generating, if needed) data flow metadata describing relationships between data items in order to identify data items that are related to the identified data items. The information accessed can include the four types of information used in FIGS. 2A and 2B or the source-specific information used in FIG. 3.

Once data items satisfying the query and appropriate relating data items have been identified at 410, the data flow tracking module can determine whether the results should be filtered in some way (e.g., in response to the user that generated the query specifying that the results should be delivered in a certain format or order or that certain results should be omitted), as indicated at 430. If the results do not need filtering, the data flow tracking module can simply return a list of the data items identified at 410 to the user that generated the query (e.g., by outputting the information via the interface via which the query was received and/or by saving the information in a file). The list of data items can identify the data items that are relevant to the query, as well as their relationships to each other. For example, the list could identify the degree of similarity between a pair of data items, as well as that one data item resulted from a transformation of another data item.

If the results need filtering (e.g., to exclude certain items from data sources that were excluded from the query, to sort the results in chronological order, and the like), the data flow tracking module will process the results to perform the needed filtering, as shown at 450. The filtered results are then output to the user that submitted the query, as indicated at 460.

Figure 5:
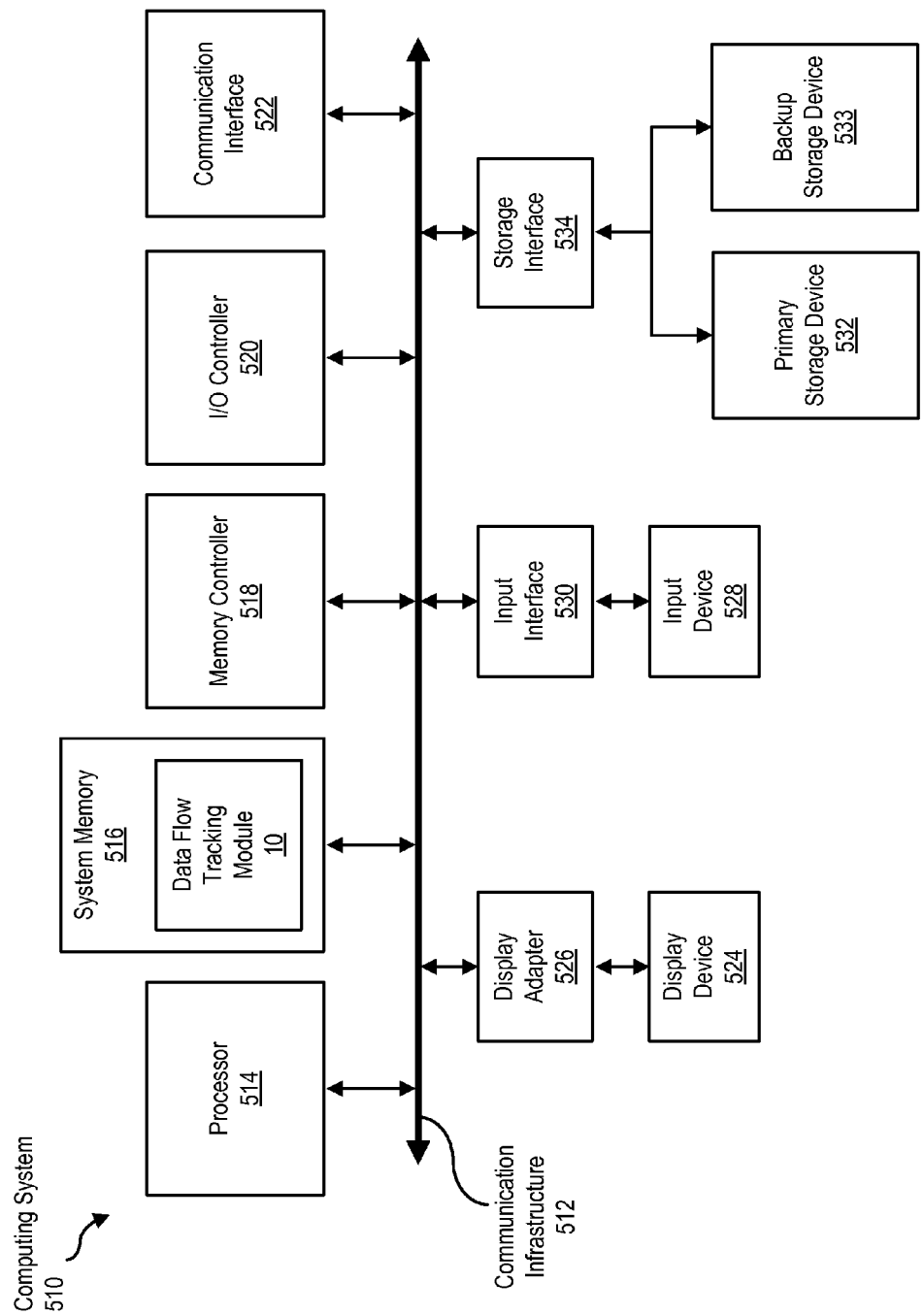
FIG. 5 is a block diagram of a computing system that implements a data flow tracking module, according to one embodiment.

FIG. 5 is a block diagram of a computing system 510 capable of implementing a data flow tracking module as described above. Computing system 510 broadly represents any single or multi-processor computing device or system capable of executing computer-readable instructions. Examples of computing system 510 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 510 may include at least one processor 514 and a system memory 516. By executing the software that implements a data flow tracking module 10, computing system 510 becomes a special purpose computing device that is configured to access relationship-related metadata in order to generate data flow metadata, and to respond to queries based upon the data flow metadata.

Processor 514 generally represents any type or form of processing unit capable of processing data or interpreting and executing instructions. In certain embodiments, processor 514 may receive instructions from a software application or module. These instructions may cause processor 514 to perform the functions of one or more of the embodiments described and/or illustrated herein. For example, processor 514 may perform and/or be a means for performing the operations described herein. Processor 514 may also perform and/or be a means for performing any other operations, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, program instructions executable to implement a data flow tracking module 10 (e.g., as shown in FIG. 1) may be loaded into system memory 516.

In certain embodiments, computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an Industry Standard Architecture (ISA), Peripheral Component Interconnect (PCI), PCI express (PCIe), or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the operations or features described and/or illustrated herein.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

Computing system 510 may also include at least one input device 528 coupled to communication infrastructure 512 via an input interface 530. Input device 528 generally represents any type or form of input device capable of providing input, either computer or human generated, to computing system 510. Examples of input device 528 include, without limitation, a keyboard, a pointing device, a speech recognition device, or any other input device.

As illustrated in FIG. 5, computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510. A storage device like primary storage device 532 can store information such relationship-related metadata and data flow metadata.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5.

Computing system 510 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 510 for storage in memory via a network such as the Internet or upon a carrier medium.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the embodiments described and/or illustrated herein. Additionally or alternatively, one or more of the embodiments described and/or illustrated herein may be implemented in firmware and/or hardware. For example, computing system 510 may be configured as an application specific integrated circuit (ASIC) adapted to implement one or more of the embodiments disclosed herein.

Figure 6:
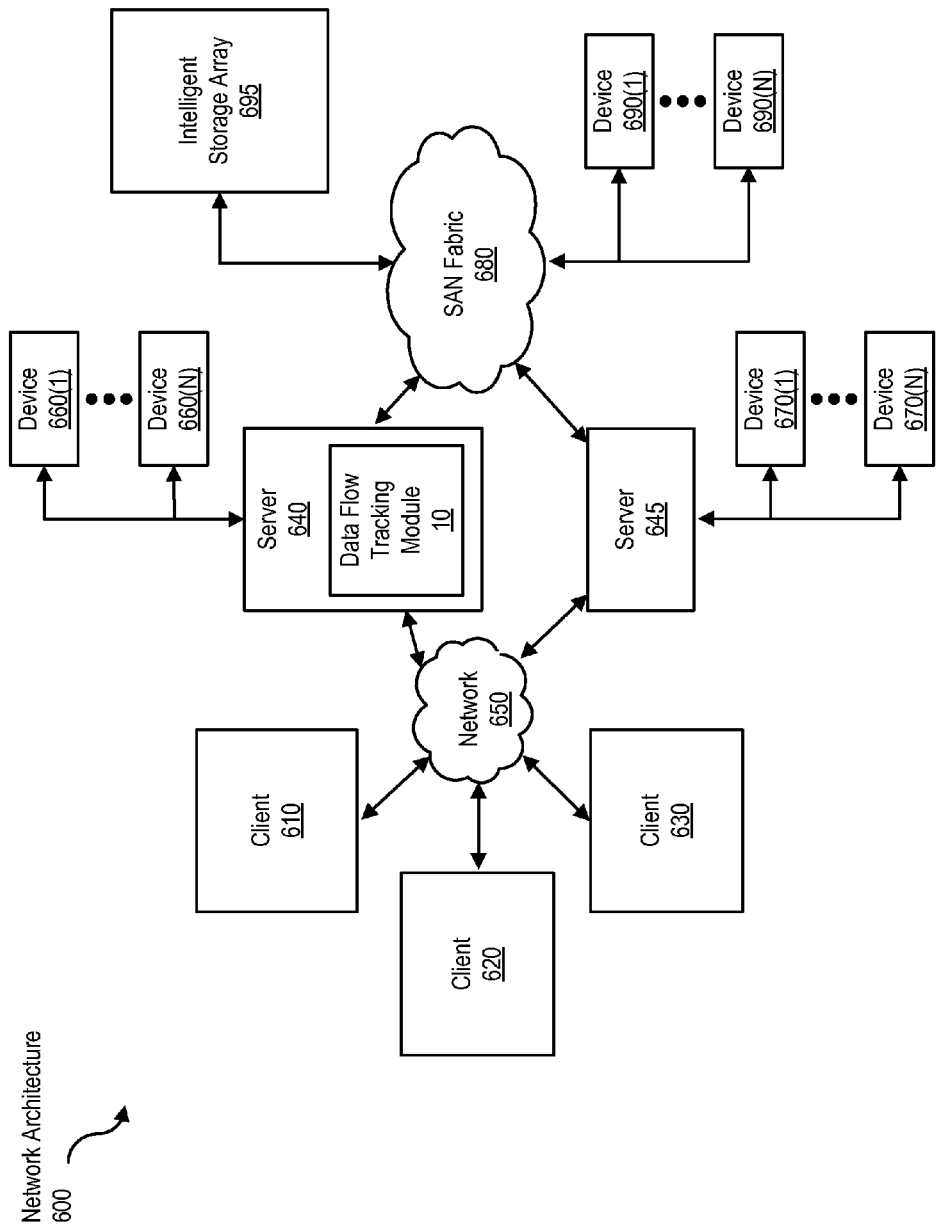
FIG. 6 is a block diagram of a networked computing system that implements a data flow tracking module, according to one embodiment.

FIG. 6 is a block diagram of a network architecture 600 in which client systems 610, 620, and 630 and servers 640 and 645 may be coupled to a network 650. Client systems 610, 620, and 630 generally represent any type or form of computing device or system, such as computing system 510 in FIG. 5.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, one or more of servers 640 and 645 and/or client systems 610, 620, and 630 may include a data flow tracking module 10 as shown in FIGS. 1 and 5.

As illustrated in FIG. 6, one or more storage devices 640(1)-(N) may be directly attached to server 640. Similarly, one or more storage devices 670(1)-(N) may be directly attached to server 645. Storage devices 640(1)-(N) and storage devices 670(1)-(N) generally represent any type or form of storage device or medium capable of storing data and/or other computer-readable instructions. In certain embodiments, storage devices 640(1)-(N) and storage devices 670(1)-(N) may represent network-attached storage (NAS) devices configured to communicate with servers 640 and 645 using various protocols, such as Network File System (NFS), Server Message Block (SMB), or Common Internet File System (CIFS). Such storage devices can store relationship-related metadata and/or data flow metadata as described above.

Servers 640 and 645 may also be connected to a storage area network (SAN) fabric 680. SAN fabric 680 generally represents any type or form of computer network or architecture capable of facilitating communication between multiple storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 640(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 640(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 640, server 645, storage devices 640(1)-(N), storage devices 670(1)-(N), storage devices 690(1)-(N), intelligent storage array 695, or any combination thereof. All or a portion of one or more of the embodiments disclosed herein may also be encoded as a computer program, stored in server 640, run by server 645, and distributed to client systems 610, 620, and 630 over network 650.

In some examples, all or a portion of one of the systems in FIGS. 1, 5, and 6 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a data flow tracking module may transform the behavior a computing device such that the computing device stores relationship-related metadata and/or generates data flow metadata from the relationship-related metadata. A data flow tracking module may also process a set of data flow metadata to generate a response to a query.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    receiving a query comprising one or more search terms;
    identifying, using the one or more search terms, a set of responsive text-based data items from a plurality of text-based data items, wherein
        the plurality of text-based data items were generated by a plurality of data sources, and
        the set of responsive text-based data items comprises a plurality of the text-based data items that are responsive to the query;
    identifying one or more related text-based data items in the set of responsive text-based data items, wherein
        each text-based data item comprises a plurality of text-based data pieces, and
        the identifying the one or more related text-based data items comprises parsing a first text-based data item of the plurality of text-based data items into at least two first text-based data pieces, parsing a second text-based data item of the plurality of text-based data items into at least two second text-based data pieces, generating a fingerprint for each of the first text-based data pieces and for each of the second text-based data pieces, and comparing the fingerprints corresponding to the first text-based data pieces with the fingerprints corresponding to the second text-based data pieces to determine whether any of the first text-based data pieces are identical to any of the second text-based data pieces;

responding to the query with information identifying the set of responsive text-based data items and one or more relationships, wherein the responding comprises generating a time-sorted list of information based on two or more of a plurality of sets of relationship-related metadata;

generating one or more clusters of related data items, wherein each of the one or more clusters is generated using the information, and each cluster is grouped based upon a respective search term of the one or more search terms; and displaying the one or more clusters to a user.

2. The method of claim 1, further comprising accessing metadata, wherein the metadata identifies the plurality of text-based data items, the metadata comprises the plurality of sets of relationship-related metadata, and each of the plurality of sets of relationship-related metadata is specific to a respective one of the plurality of data sources.

3. The method of claim 2, wherein the time-sorted list of information identifies data in more than one of the data sources.

4. The method of claim 1, further comprising accessing metadata associated with the plurality of text-based data items, wherein the metadata comprises location information identifying a respective location of each of the plurality of text-based data items, trigger information identifying a trigger for a transition or transformation, and transition or transformation information identifying a relationship between a first one of the plurality of text-based data items and a second one of the plurality of text-based data items.

5. The method of claim 4, wherein the trigger information comprises an error indication if the trigger cannot be identified as a specific type of trigger.

6. The method of claim 2, wherein the accessing the metadata comprises querying a data governance tool, wherein the data governance tool performs data discovery for the plurality of data sources.

7. The method of claim 1, further comprising accessing metadata associated with the plurality of text-based data items, wherein the metadata comprises identity information identifying each of the plurality of text-based data items, and the identity information comprises a fingerprint and indexing information.

8. A computer readable storage medium comprising program instructions executable to:

receive a query comprising one or more search terms;

identify, using the one or more search terms, a set of responsive text-based data items from a plurality of text-based data items, wherein the plurality of text-based data items were generated by a plurality of data sources, and the set of responsive text-based data items comprises a plurality of the text-based data items that are responsive to the query;

identify one or more related text-based data items in the set of responsive text-based data items, wherein each text-based data item comprises a plurality of text-based data pieces, and identifying the one or more related text-based data items comprises parsing a first text-based data item of the plurality of text-based data items into at least two first text-based data pieces, parsing a second text-based data item of the plurality of text-based data items into at least two second text-based data pieces, generating a fingerprint for each of the first text-based data pieces and for each of the second text-based data pieces, and comparing the fingerprints corresponding to the first text-based data pieces with the fingerprints corresponding to the second text-based data pieces to determine whether any of the first text-based data pieces are identical to any of the second text-based data pieces;

respond to the query with information identifying the set of responsive text-based data items and one or more relationships, wherein responding to the query comprises generating a time-sorted list of information based on two or more of a plurality of sets of relationship-related metadata;

generate one or more clusters of related data items, wherein each of the one or more clusters is generated using the information, and each cluster is grouped based upon a respective search term of the one or more search terms; and displaying the one or more clusters to a user.

9. The computer readable storage medium of claim 8, wherein the program instructions are further executable to access metadata, wherein the metadata identifies the plurality of text-based data items, the metadata comprises the plurality of sets of relationship-related metadata, and each of the plurality of sets of relationship-related metadata is specific to a respective one of the plurality of data sources.

10. The computer readable storage medium of claim 9, wherein the time-sorted list of information identifies data in more than one of the data sources.

11. The computer readable storage medium of claim 8, wherein the program instructions are further executable to access metadata associated with the plurality of text-based data items, wherein the metadata comprises location information identifying a respective location of each of the plurality of text-based data items, trigger information identifying a trigger for a transition or transformation, and transition or transformation information identifying a relationship between a first one of the plurality of text-based data items and a second one of the plurality of text-based data items.

12. The computer readable storage medium of claim 11, wherein the trigger information comprises an error indication if the trigger cannot be identified as a specific type of trigger.

13. The computer readable storage medium of claim of claim 9, wherein accessing the metadata comprises querying a data governance tool, wherein the data governance tool performs data discovery for the plurality of data sources.

14. The computer readable storage medium of claim 8, wherein the program instructions are further executable to:
  access metadata associated with the plurality of text-based data items, wherein
    the metadata comprises identity information identifying each of the plurality of text-based data items, and
    the identity information comprises a fingerprint and indexing information.

15. A system comprising:
one or more processors; and
a memory coupled to the one or more processors, wherein the memory stores program instructions executable by the one or more processors to:
  receive a query comprising one or more search terms;
  identify, using the one or more search terms, a set of responsive text-based data items from a plurality of text-based data items, wherein
    the plurality of text-based data items were generated by a plurality of data sources, and
    the set of responsive text-based data items comprises a plurality of the text-based data items that are responsive to the query;
  identify one or more related text-based data items in the set of responsive text-based data items, wherein
    each text-based data item comprises a plurality of text-based data pieces, and
    identifying the one or more related text-based data items comprises
      parsing a first text-based data item of the plurality of text-based data items into at least two first text-based data pieces,
      parsing a second text-based data item of the plurality of text-based data items into at least two second text-based data pieces,
      generating a fingerprint for each of the first text-based data pieces and for each of the second text-based data pieces, and
      comparing the fingerprints corresponding to the first text-based data pieces with the fingerprints corresponding to the second text-based data pieces to determine whether any of the first text-based data pieces are identical to any of the second text-based data pieces;
  respond to the query with information identifying the set of responsive text-based data items and one or more relationships, wherein
    responding to the query comprises generating a time-sorted list of information based on two or more of a plurality of sets of relationship-related metadata;
  generate one or more clusters of related data items, wherein
    each of the one or more clusters is generated using the information, and
    each cluster is grouped based upon a respective search term of the one or more search terms; and
  displaying the one or more clusters to a user.

16. The system of claim 15, wherein the program instructions are further executable to access metadata, wherein
  the metadata identifies the plurality of text-based data items,
  the metadata comprises the plurality of sets of relationship-related metadata, and
  each of the plurality of sets of relationship-related metadata is specific to a respective one of the plurality of data sources.

17. The system of claim 16, wherein the time-sorted list of information identifies data in more than one of the data sources.

18. The system of claim 15, wherein the program instructions are further executable to access metadata associated with the plurality of text-based data items, wherein the metadata comprises
  location information identifying a respective location of each of the plurality of text-based data items,
  trigger information identifying a trigger for a transition or transformation, and
  transition or transformation information identifying a relationship between a first one of the plurality of text-based data items and a second one of the plurality of text-based data items.

19. A system of claim 15, wherein the program instructions are further executable to:
  access metadata associated with the plurality of text-based data items, wherein
    the metadata comprises identity information identifying each of the plurality of text-based data items, and
    the identity information comprises a fingerprint and indexing information.

* * * * *